United States Patent
Rothoff et al.

(10) Patent No.: US 12,117,209 B2
(45) Date of Patent: Oct. 15, 2024

(54) FLOW HEATER WITH BYPASS PASSAGE

(71) Applicant: BorgWarner Ludwigsburg GmbH, Ludwigsburg (DE)

(72) Inventors: Andreas Rothoff, Markdorf (DE); Sven Schumm, Walheim (DE); Timo Stifel, Freiberg am Neckar (DE); Benjamin Sprygada, Battle Creek, MI (US); Mario Hoppe, Ludwigsburg (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 622 days.

(21) Appl. No.: 17/480,807

(22) Filed: Sep. 21, 2021

(65) Prior Publication Data

US 2022/0099336 A1  Mar. 31, 2022

(30) Foreign Application Priority Data

Sep. 25, 2020 (DE) .................... 10 2020 125 107.6

(51) Int. Cl.
*F24H 9/00* (2022.01)
*B01D 19/00* (2006.01)
*C02F 1/20* (2023.01)
*F24H 1/10* (2022.01)

(52) U.S. Cl.
CPC ....... *F24H 9/0015* (2013.01); *B01D 19/0042* (2013.01); *C02F 1/20* (2013.01); *F24H 1/105* (2013.01)

(58) Field of Classification Search
CPC ....... B01D 19/0042; F24H 1/105; F24H 9/00; F24H 9/0005; F24H 9/001; F24H 9/0015; F24H 9/18; F24H 9/0809
USPC .......................................... 392/314
See application file for complete search history.

(56) References Cited

U.S. PATENT DOCUMENTS

| | | | |
|---|---|---|---|
| 2012/0148220 A1* | 6/2012 | Koga | F24H 1/102 392/485 |
| 2019/0077224 A1 | 3/2019 | McCarthy et al. | |
| 2022/0003455 A1* | 1/2022 | Lim | F24H 9/1818 |

FOREIGN PATENT DOCUMENTS

DE  10 2017 121 341 B4  9/2019
WO  WO 2020/032417 A1  2/2020

* cited by examiner

*Primary Examiner* — Sang Y Paik
(74) *Attorney, Agent, or Firm* — Bose McKinney & Evans LLP

(57) ABSTRACT

Disclosed is a flow heater with a housing having an inlet and an outlet. A flow passage for liquid that is to be heated runs from the inlet to the outlet. A heating plate is arranged as wall of a heated section of the flow passage. A bypass passage is provided in parallel to the heated section of the flow passage in order to guide any gas bubbles contained in the liquid from the fluid inlet to the fluid outlet without passing through the heated section of the flow passage.

9 Claims, 3 Drawing Sheets

FLOW HEATER WITH BYPASS PASSAGE

RELATED APPLICATIONS

This application claims priority to DE 10 2020 125 107.6, filed Sep. 25, 2020, the entire disclosure of which is hereby incorporated herein by reference.

BACKGROUND AND SUMMARY

This disclosure relates to flow heaters of the type generally known, for example, from DE 10 2017 121 341 B4.

Flow heaters are required, for example in cars, in order to heat various liquids, in particular water, or aqueous solutions. Constant objectives in the development of flow heaters for cars are: a compact design, low manufacturing costs and a high efficiency, such that a large quantity of liquid can be heated up in a short time.

This disclosure teaches a flow heater that achieves these objectives to a great extent.

The water circuit of motor vehicles may sometimes contain gas bubbles, or these may develop over time. Gas bubbles in a flow heater can impair the heat transfer from the heating plate, which carries an electrical heating resistance, to the liquid, especially if these gas bubbles accumulate in the flow heater. In a flow heater according to this disclosure, a bypass passage counteracts the problem of gas bubbles reaching the heating plate, or even accumulating on the latter.

In a flow heater according to this disclosure the heating plate forms a wall of a heated section of the flow passage. This heated section is connected in parallel to the bypass passage. Thus gas bubbles that might be present in the liquid can be brought from the inlet to the outlet without passing through the heated section of the flow passage.

The parallel connection of the flow passage is to be understood in a fluidic context and the word "parallel" therefore does not imply the bypass passage is geometrically parallel to the heated section of the flow passage. Rather, "parallel connection" means that the bypass passage braches away from the flow passage upstream of the heated section and joins the flow passage downstream of the heated section. Part of the liquid that enters at the inlet into the flow heater therefore flows through the heated section of the flow passage to the outlet and another part flows from the inlet through the bypass passage. The part that flows through the heated section of the flow passage is larger than the part that flows through the bypass passage, preferably at least 10 times as large. For example, the bypass passage may have a flow resistance that is at least 10 times as large as the flow resistance of the heated section of the flow passage.

When liquid flows through the heated section of the flow passage, friction causes a loss of pressure. Hence, pressure is higher at the beginning of the bypass passage than at the end of the bypass passage. This pressure differential can be used to suck any bubbles that may be present into the bypass passage.

In an advantageous refinement of this disclosure the pressure differential may be increased by widening the flow passage between the inlet and the heated section. In a corresponding embodiment of this disclosure the cross section of the inlet is smaller than the cross section of the heated section. Moreover, the pressure differential can be increased if the flow passage narrows between the heated section and the outlet. In this way, it can be achieved that the velocity of flow decreased after the inlet and increases again before the outlet. A higher velocity before the outlet than after the inlet causes a pressure differential such that any bubbles that might be present can be sucked through the bypass passage more efficiently.

The flow heater is intended to be oriented in operation such that the beginning of the bypass passage is on an upper wall of the flow passage. Gravity then causes any bubbles to rise such they can enter the bypass passage more easily.

In one embodiment, the heated section may have a U-shaped form. Then the heated section has two legs that are connected at one end. Such a form of the flow passage can be achieved, e.g., by a separating wall that is arranged between the two legs and connected to the heating plate. In such an embodiment liquid may flow downwards along one side of the separating wall and thereafter upwards on the other side of the separating wall. In such an embodiment, the bypass passage may be provided as an opening in the separating wall at its upper end or as a conduit that directly connects the upper ends of the two legs of the U-shaped flow passage.

In an embodiment, the heated section of the flow passage may be a gap between a heating plate and a flow guide plate that extends along the heating plate, e.g., in parallel. The flow guide plate may be made of sheet metal, for example. The bypass passage may then be provided as a groove in an upper side of the flow guide plate and/or in a lower side of an intermediate wall connected to the lower side of the flow guide plate. Alternatively, the flow guide plate and the inner wall may be made integrally as a single piece. In both cases the bypass passage may be provided as a bore that passes through the intermediate wall.

In an embodiment, the intermediate wall can have a very large wall thickness, and can be designed, for example, as a base, or lowered section, of a housing cover, or a raised section of a housing floor. The intermediate wall has a height that is to be measured at right angles to the upper face of the flow guide plate abutting onto the wall, a width or wall thickness that is to be measured in the direction of a line connecting the inlet and outlet, and a length that is to be measured at right angles to its height and wall thickness. Here the wall thickness can be several times as large as the wall height, and may also be greater than the wall length.

In a further advantageous refinement, provision is made for the thickness of the intermediate wall to increase with increasing separation distance from the inlet opening. In this manner, the flow can be better guided, and the formation of eddies and stagnation zones can be avoided.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
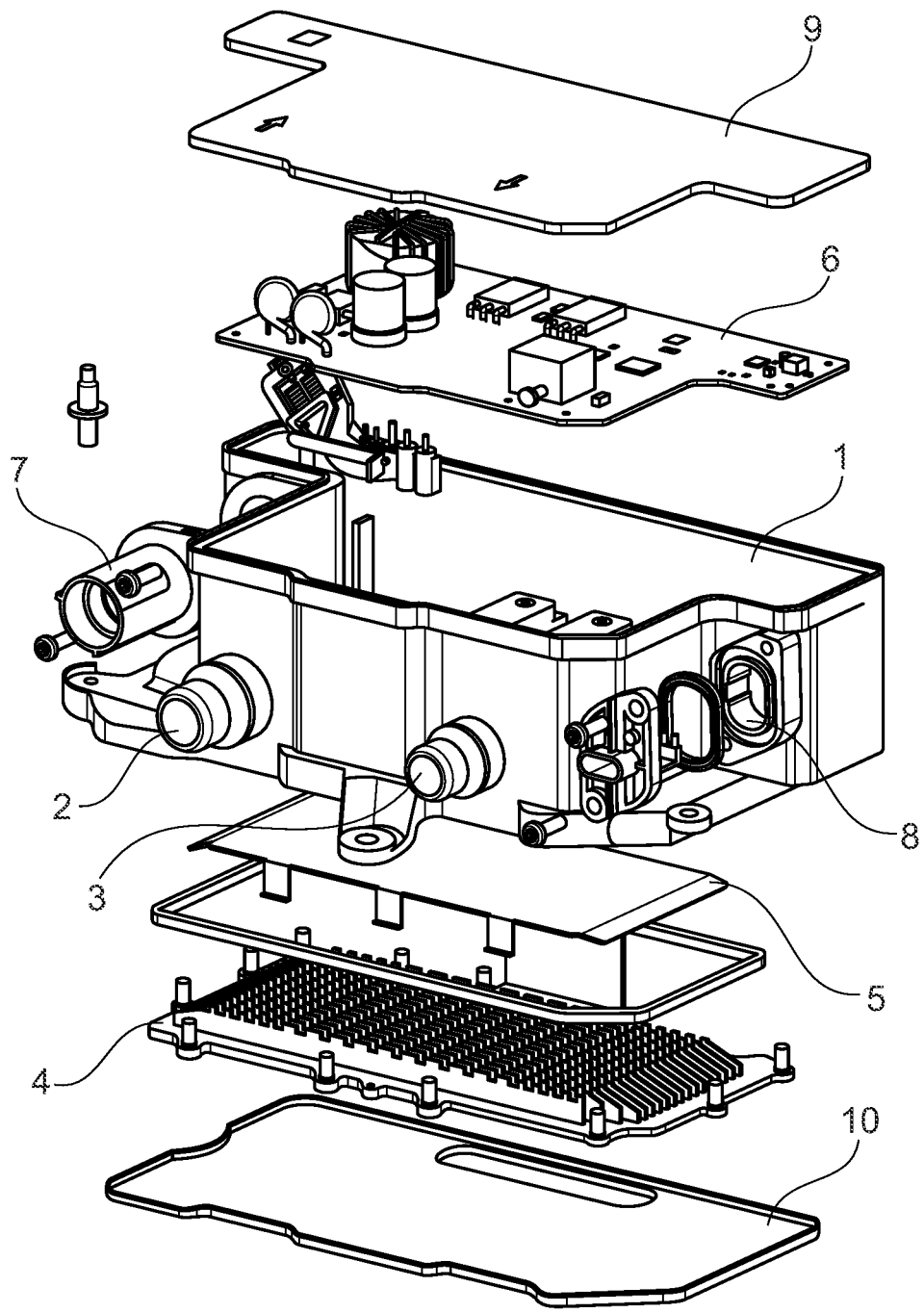
FIG. 1 shows an exploded view of a flow heater.

The flow heater shown in FIG. 1 has a housing 1, which has an inlet 2 and an outlet 3. In the embodiment shown, the inlet 2 and the outlet 3 are arranged side-by-side on the same side of the housing 1; however, the inlet 2 and the outlet 3 can also be arranged on different sides of the housing.

A heating plate 4, which carries an electrical heating resistor, for example in the form of printed conductor paths, and a flow guide plate 5, are arranged in the housing 1. In addition, a circuit board 6 with control electronics is arranged in the housing 1, which circuit board can be connected to a supply voltage and communication lines by way of connector terminals 7, 8 provided by the housing 1. Above and below the housing 1 is closed with covers 9, 10.

Figure 2:
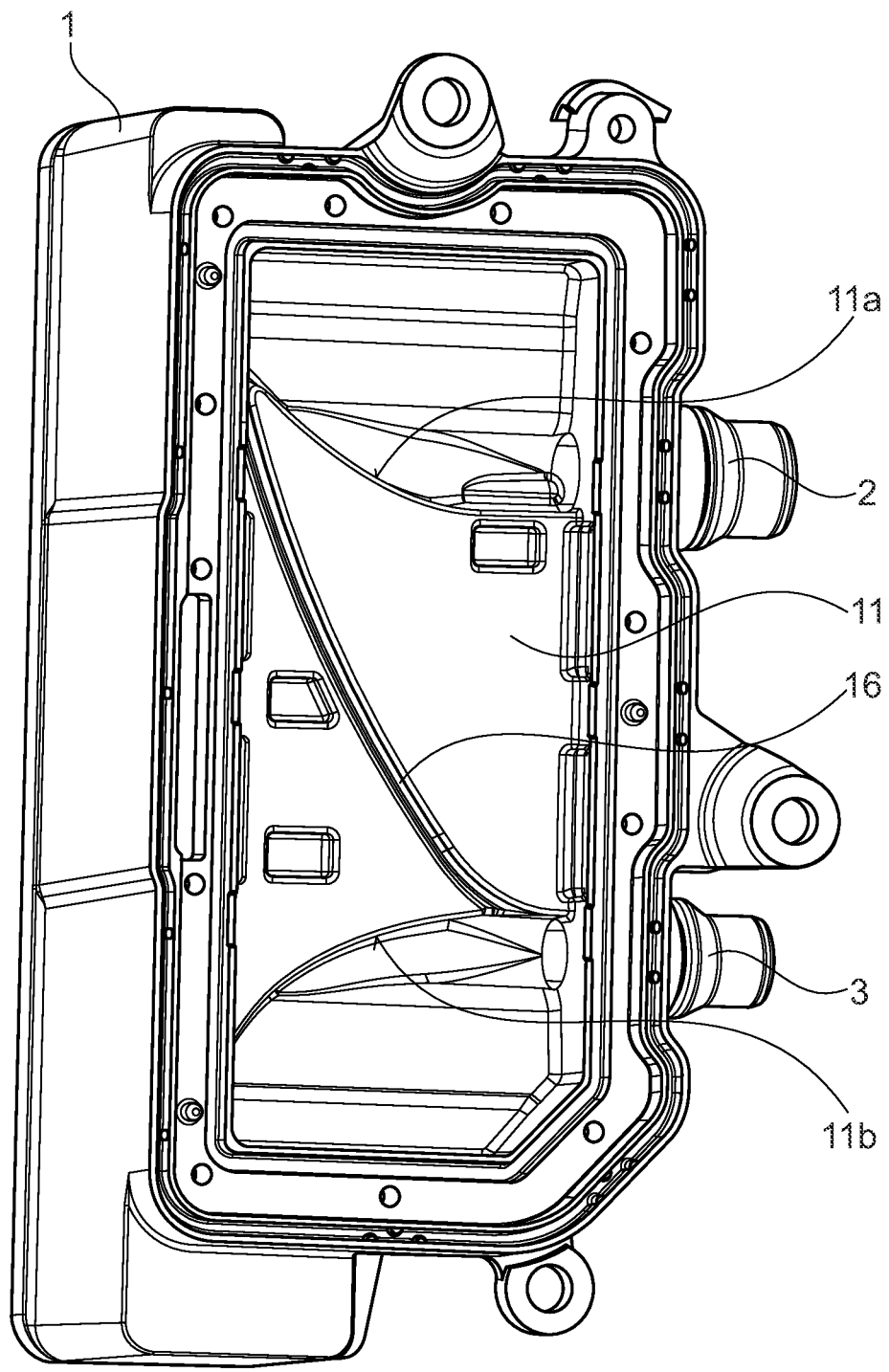
FIG. 2 shows the housing of the continuous-flow heater, as viewed from below.
Figure 3:
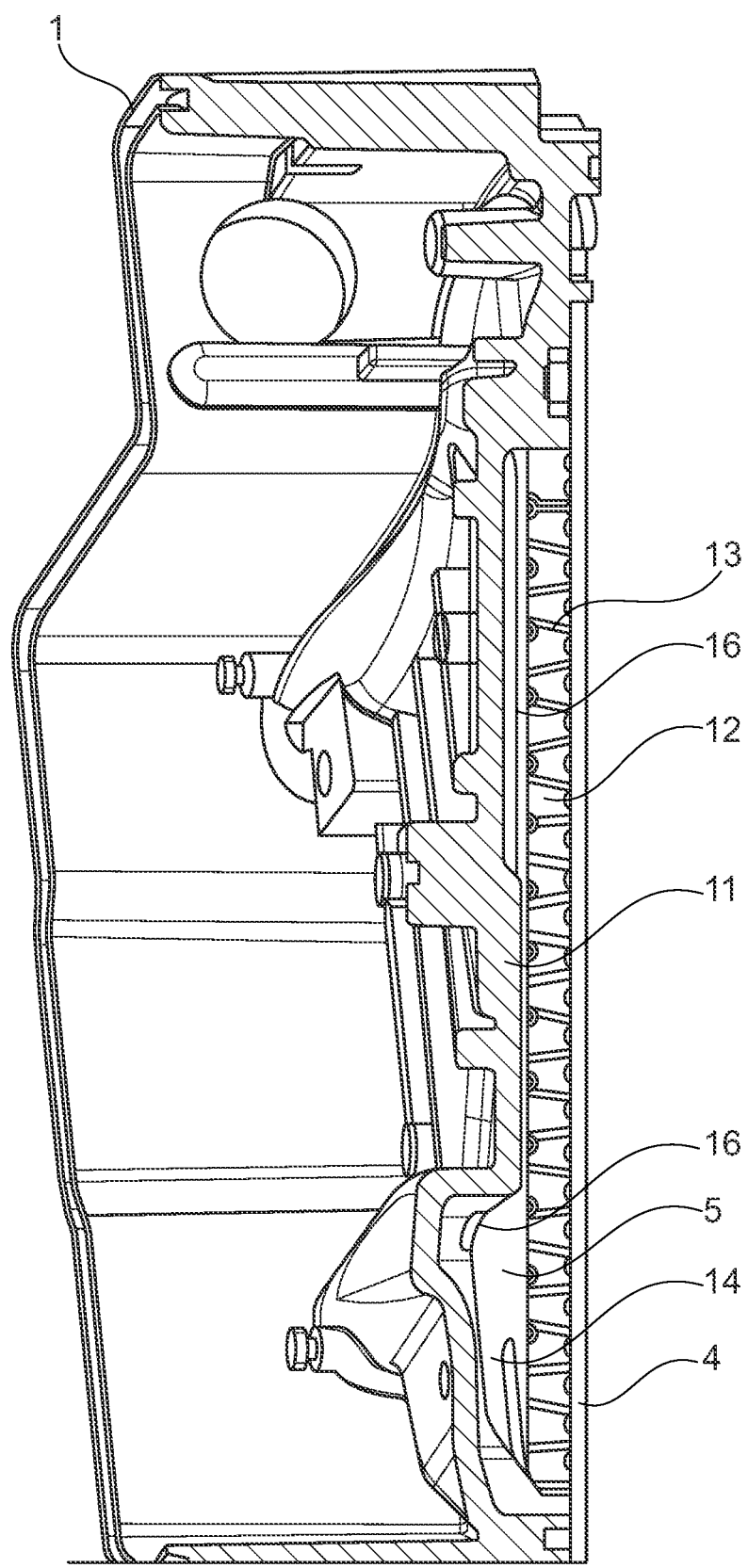
FIG. 3 shows a simplified cross-sectional view of the flow heater.

In the housing 1, which can, for example, be made of metal, a flow passage for liquid that is to be heated runs from the inlet 2 to the outlet 3. The course of this flow passage can best be understood with the aid of FIG. 2, which shows the housing 1 of the flow heater as seen from below (with reference to the orientation shown in FIG. 1), and FIG. 3, which schematically shows a simplified cross-sectional view of the flow heater.

The flow guide plate 5, which can, for example, be made of sheet metal, abuts an intermediate wall 11, which is arranged in the housing 1 between the inlet 2 and the outlet 3. The heating plate 4 is a wall of the heated section of the flow passage. In the embodiment shown, the heated section of the flow passage is provided as a gap between the heating plate 4, which may have heat dissipation fins 13, and the flow guide plate 5.

In the orientation of FIG. 1, the gap is bounded by the lower face of the flow guide plate 5 and the upper face of the heating plate 4. At both the inlet 2 and the outlet 3, the flow passage can have in each case a section 14 that runs along the other face of the flow guide plate 5, that is to say, along the upper face of the flow guide plate 5.

In order to prevent bubbles from accumulating in the continuous-flow heater, a bypass passage 16 branches away from the flow passage at some point between the inlet 2 and the heated section of the flow passage and reconnects to the flow passage downstream of the heated section of the flow passage. Thereby the bypass passage is connected in parallel to the heated section of the flow passage. In the embodiment shown the bypass passage is provided by means of a groove in an upper face of intermediate wall 11 which the flow guide plate 5 contacts.

With its front face 11a and its rear face 11b, the intermediate wall 11 bounds a start section and an end section of the flow passage. Here the thickness of the intermediate wall 11, measured between the front face 11a and the rear face 11b, can increase with increasing distance from the inlet 2. In this manner, the formation of eddies and stagnation zones is counteracted.

The flow passage widens in the housing 1 between the inlet 2 and the heated section of the flow passage. In other words, between the inlet 2 and the gap the flow passage has a larger cross-sectional area than that of the inlet 2. This means that the flow velocity of liquid decreases after entry into the housing 1. In the region between the heated section. In the region between the heated section and the outlet 3, the cross-sectional area of the flow passage is reduced to the cross-sectional area of the outlet 3.

The bypass passage 16 has a significantly higher flow resistance than the heated section of the flow passage 12, that is to say the gap between the heating plate 4 and the flow guide plate 5, for example ten times or more. In this manner it is possible to ensure that only a small portion of the liquid flows through the bypass passage 16. In order to achieve a high flow resistance, it is advantageous to design the bypass passage 16 to be narrow. For example, at its narrowest point the bypass passage 16 can have a cross-sectional area that is no more than one-fiftieth of the cross-sectional area of the heated section of the flow passage 12 formed by the gap.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SYMBOLS

1 Housing
2 Inlet
3 Outlet
4 Heating plate
5 Flow guide plate
6 Circuit carrier board
7 Connector
8 Connector
9 Cover
10 Cover
11 Intermediate wall
11a Front face of the intermediate wall
11b Rear face of the intermediate wall
12 Flow passage
13 Heat dissipation fins
14 Section of the flow passage
15 Bypass passage

What is claimed is:

1. A flow heater, comprising:
a housing having an inlet and an outlet;
a flow passage configured for liquid that is to be heated extending from the inlet to the outlet;
a heating plate comprising a wall of a heated section of the flow passage;
a bypass passage disposed in parallel to the heated section of the flow passage, the bypass passage configured to guide gas bubbles contained in the liquid from the inlet to the outlet without passing through the heated section of the flow passage.

2. The flow heater according to claim 1, wherein the heated section of the flow passage comprises a gap between the heating plate and a flow guide plate.

3. The flow heater according to claim 2, wherein the bypass passage runs along an upper face of the flow guide plate and the heated section of the flow passage runs along a lower face of the flow guide plate.

4. The flow heater according to claim 2, wherein the flow guide plate abuts against an intermediate wall arranged in the housing between the inlet and the outlet.

5. The flow heater according to claim 4, wherein the bypass passage comprises a groove in a lower face of the intermediate wall, against which the flow guide plate abuts.

6. The flow heater according to claim 4, wherein the intermediate wall has a thickness that increases with increasing distance from the inlet.

7. The flow heater according to claim 3, wherein, between the inlet and the heated section of the flow passage, a section of the flow passage runs along the upper face of the flow guide plate.

8. The flow heater according to claim 3, wherein, between the heated section of the flow passage and the outlet, a section of the flow passage runs along the upper face of the flow guide plate.

9. The flow heater according to claim 1, wherein the bypass passage has a flow resistance that is at least 10 times as large as the flow resistance of the heated section of the flow channel.

* * * * *